(12) United States Patent
Wörner et al.

(10) Patent No.: US 8,349,029 B2
(45) Date of Patent: Jan. 8, 2013

(54) FIBER-REACTIVE AZO DYES AND DYE MIXTURES, PREPARATION THEREOF AND USE THEREOF

(75) Inventors: Jörg Wörner, Bruchköbel (DE); Andreas Schrell, Hofheim (DE)

(73) Assignee: DyStar Colours Deutschland GmbH (DE)

( * ) Notice: Subject to any disclaimer, the term of this patent is extended or adjusted under 35 U.S.C. 154(b) by 0 days.

(21) Appl. No.: 13/361,213

(22) Filed: Jan. 30, 2012

(65) Prior Publication Data

US 2012/0216356 A1    Aug. 30, 2012

Related U.S. Application Data

(63) Continuation of application No. 13/133,426, filed as application No. PCT/EP2009/065682 on Nov. 24, 2009, now abandoned.

(30) Foreign Application Priority Data

Dec. 9, 2008   (DE) .................. 10 2008 054 404

(51) Int. Cl.
C09B 62/01     (2006.01)
C09B 62/085    (2006.01)

(52) U.S. Cl. .......... 8/687; 8/639; 8/641; 8/662; 8/667; 8/669; 8/673; 8/680; 8/681; 8/682; 8/683; 8/684; 8/693; 8/916; 8/920; 106/31.27

(58) Field of Classification Search ......... 8/639, 641, 8/662, 667, 669, 673, 680, 681, 682, 683, 8/684, 687, 693, 916, 920; 106/31.27
See application file for complete search history.

(56) References Cited

U.S. PATENT DOCUMENTS

| | | | |
|---|---|---|---|
| 5,817,779 A | 10/1998 | Deitz et al. | |
| 5,849,887 A * | 12/1998 | Lehmann et al. | 534/642 |
| 7,109,313 B2 | 9/2006 | Meier et al. | |
| 2008/0184912 A1 | 8/2008 | Lee et al. | |

FOREIGN PATENT DOCUMENTS

| | | |
|---|---|---|
| CH | 695613 A5 | 7/2006 |
| EP | 0785237 A1 | 7/1997 |
| EP | 0 870 807 A1 | 10/1998 |
| EP | 1234858 A2 | 8/2002 |
| EP | 1669415 A1 | 6/2006 |
| EP | 1760117 A2 | 3/2007 |
| GB | 1349168 A | 3/1974 |
| KR | 20020038989 A | 5/2002 |
| WO | WO-03/080738 A1 | 10/2003 |

* cited by examiner

*Primary Examiner* — Lorna M Douyon
*Assistant Examiner* — Amina Khan
(74) *Attorney, Agent, or Firm* — Connolly Bove Lodge & Hutz LLP

(57) ABSTRACT

The present invention relates to azo dyes of the formula (1)

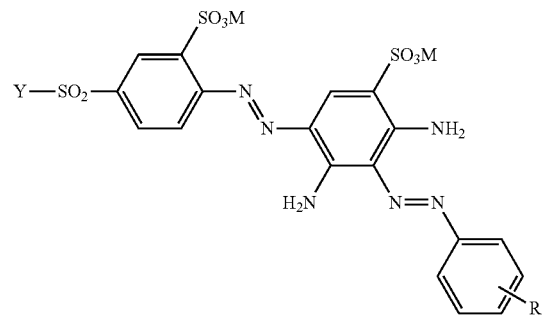

(1)

in which R, M, and Y are defined as stated in claim 1, to dye mixtures comprising them, to processes for preparing them, and to their use.

14 Claims, No Drawings

FIBER-REACTIVE AZO DYES AND DYE MIXTURES, PREPARATION THEREOF AND USE THEREOF

CROSS-REFERENCE TO RELATED APPLICATIONS

This application is a Continuation Application of U.S. application Ser. No. 13/133,426, now abandoned, filed Jun. 8, 2011 which is incorporated by reference. U.S. application Ser. No. 13/133,426, now abandoned, is a national stage application (under 35 U.S.C. §371) of PCT/EP2009/065682, filed Nov. 24, 2009, which claims benefit of European application 102008054404.3, filed Dec. 9, 2008.

BACKGROUND OF THE INVENTION

The invention is situated within the technical field of fiber-reactive azo dyes.

Within the textile industry there is a demand for orange reactive dyes with very good buildup and good fastnesses, which are needed more particularly for dyeing in mixtures with other dyes.

The dyes disclosed by EP 0 785 237 A1 and KR 20020038989 have not yet covered this demand. Consequently there is further demand for such dyes.

BRIEF SUMMARY OF THE INVENTION

The invention now present has succeeded in providing dyes which to a high demand meet the requirements for buildup, wash-off ability, and fastnesses.

The present invention provides azo dyes of the formula (1)

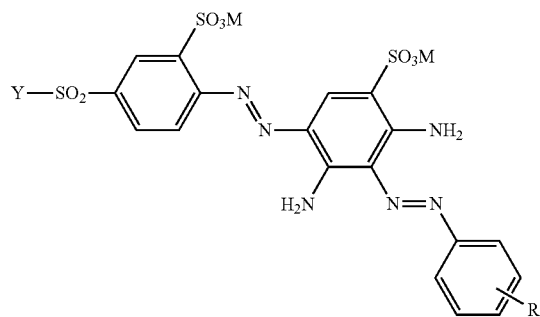

(1)

in which
Y is —CH=CH$_2$ or —CH$_2$CH$_2$Z, in which
Z is an alkali-detachable group;
R is a radical —COOR$^1$, —CN or —CONR$^2$R$^3$, in which
R$^1$ is M or (C$_1$-C$_4$)-alkyl;
R$^2$ and R$^3$ independently of one another are hydrogen or (C$_1$-C$_4$)-alkyl; and
M is hydrogen, ammonium, an alkali metal, or the equivalent of an alkaline earth metal.

DETAILED DESCRIPTION OF THE INVENTION

Alkali-detachable groups Z are, for example, halogen atoms, such as chlorine and bromine, ester groups of organic carboxylic and sulfonic acids, examples being alkylcarboxylic acids, unsubstituted or substituted benzenecarboxylic acids, and unsubstituted or substituted benzenesulfonic acids, more particularly alkanoyloxy of 2 to 5 carbon atoms such as acetyloxy, and also benzoyloxy, sulfobenzoyloxy, phenylsulfonyloxy and tolylsulfonyloxy, and also acidic ester groups of inorganic acids, such as of phosphoric acid, sulfuric acid, and thiosulfuric acid (phosphato, sulfato and thiosulfato groups), and also dialkylamino groups with alkyl groups each of 1 to 4 carbon atoms, such as dimethylamino and diethylamino.

With preference Z is vinyl or β-chloroethyl, and with more particular preference β-sulfatoethyl.

The group —SO$_2$Z may be present partly as vinylsulfonyl and partly as —SO$_2$CH$_2$CH$_2$Z, preferably as β-sulfatoethyl-sulfonyl. The fraction of the respective dye with the vinylsulfonyl group in this case is more particularly up to about 30 mol %, based on the respective total amount of dye.

(C$_1$-C$_4$)-alkyl groups R$^1$, R$^2$ or R$^3$ may be linear or branched and are for example methyl, ethyl, n-propyl, iso-propyl, n-butyl, isobutyl, sec-butyl or tert-butyl. Methyl and ethyl are preferred.

R is preferably —COOR$^1$ or —CONR$^2$R$^3$, with R$^1$, R$^2$ and R$^3$ being more particularly hydrogen.

Alkali metal M is more particularly lithium, sodium, and potassium; M as an equivalent of an alkaline earth metal is more particularly the equivalent of calcium. Preferably M is hydrogen or sodium.

The dyes of the formula (1) according to the invention can be used alone, but more particularly are used in a mixture with other reactive dyes.

The present invention accordingly also provides dye mixtures which comprise a dye of the formula (1) and at least one further fiber-reactive dye.

Suitable fiber-reactive dyes which can be used in a mixture with the dyes of the formula (1) include in principle all known fiber-reactive dyes. These dyes are known to a person skilled in the art and are described comprehensively in, for example, the Colour Index, published by the British Society of Dyers and Colourists and the American Association of Textile Chemists, and in other relevant works.

The mixing ratio between the dyes of the formula (1) and further fiber-reactive dyes may vary within wide limits and is situated for example at 1:99 to 99:1% by weight. Preferred mixing ratios are 5:95 to 95:5% by weight, 10:90 to 90:10% by weight, 20:80 to 80:20% by weight, 25:75 to 75:25% by weight, 30:70 to 70:30% by weight, 40:60 to 60:40% by weight, 45:55 to 55:45% by weight, and 50:50% by weight.

Preferred fiber-reactive dyes which can be used in a mixture with the dyes of the formula (1) are the dyes of the formula (2)

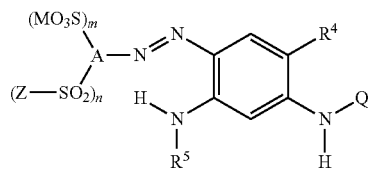

(2)

in which
A is

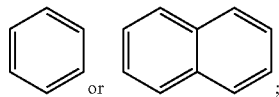

or $R^4$ is hydrogen, methyl, methoxy or sulfo;
$R^5$ is hydrogen, acetyl or carbonylamido;
n is 0 or 1;
m is 0, 1, 2 or 3;
M and Z have the definitions stated above, and
Q is a radical of the formula (a), (b) or (c)

(a)
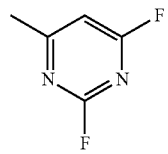

(b)
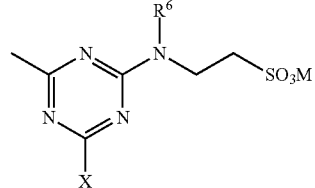

(c)
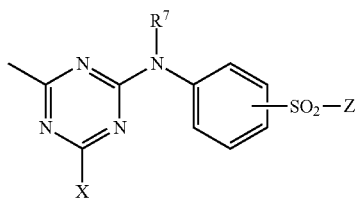

in which

X is halo, preferably fluoro or chloro;

$R^6$ and $R^7$ are hydrogen, methyl or ethyl; and

M and Z are defined as stated above.

Particularly preferred dyes of the formula (2) are the dyes of the formulae (2a) to (2h)

(2a)
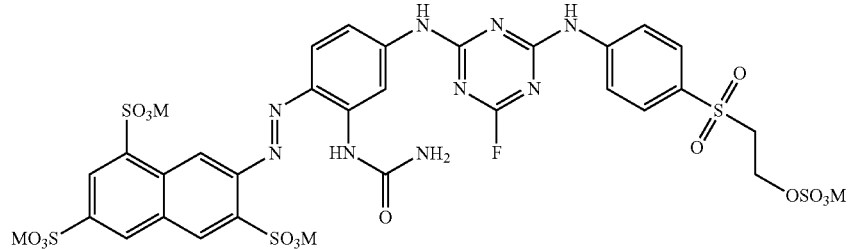

(2b)
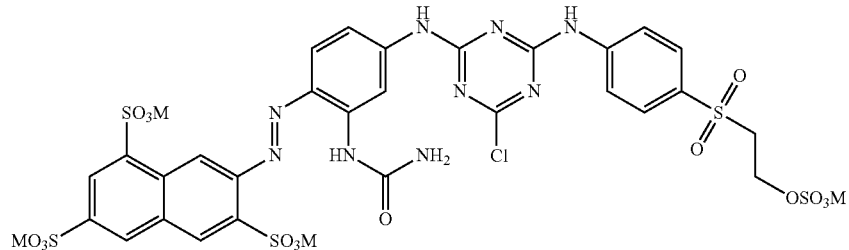

(2c)
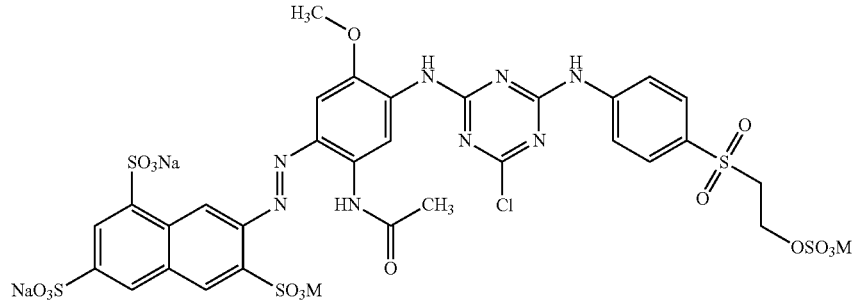

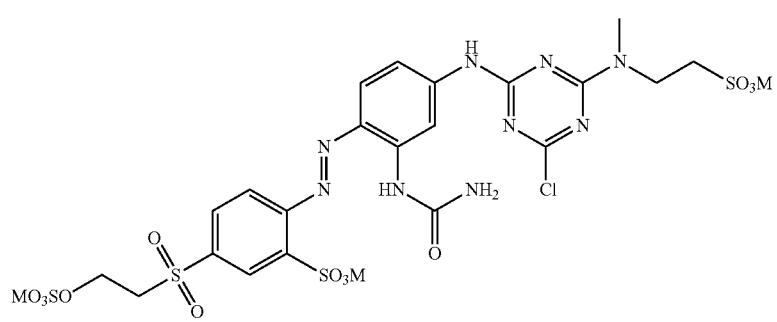
(2d)
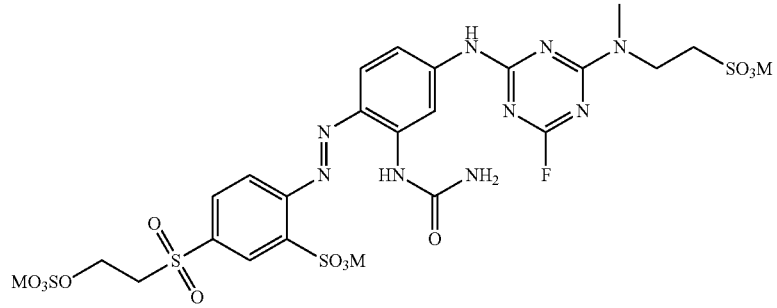
(2e)
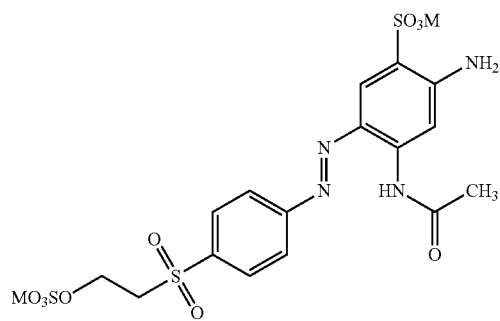
(2f)
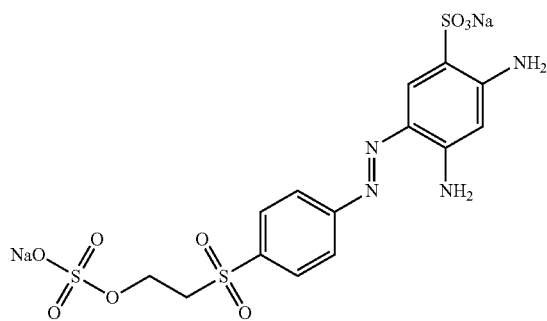
(2g)
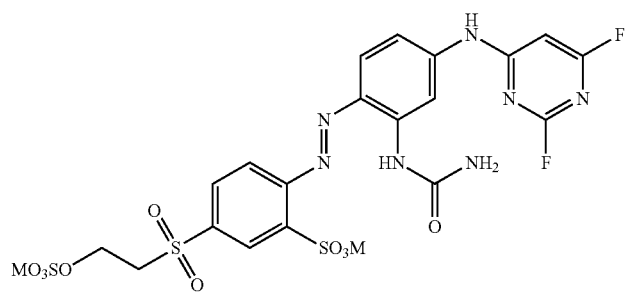
(2h)
in which M in each case is defined as stated above and is preferably hydrogen or sodium.

Mixtures of dyes of the formula (1) and dyes of the formula (2) are, more particularly, yellow- to orange-dyeing mixtures.

The mixing ratio of dye of the formula (1) to dye of the formula (2) is more particularly between 1:99 and 50:50% by weight. 10:90, 20:80 and 30:70% by weight are typical mixing ratios.

Further preferred fiber-reactive dyes which may be used in a mixture with the dyes of the formula (1) are the dyes of the formula (3)

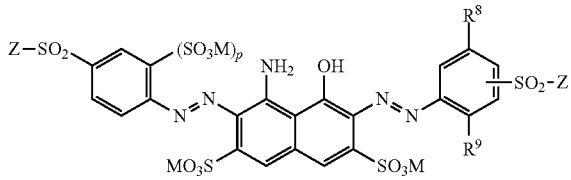

(3)

in which $R^8$ and $R^9$ independently of one another are hydrogen, methyl, ethyl, methoxy or ethoxy; and p is 0 or 1; and Z and M are defined as stated above.

Particularly preferred dyes of the formula (3) are the dyes of the formulae (3a) to (3d)

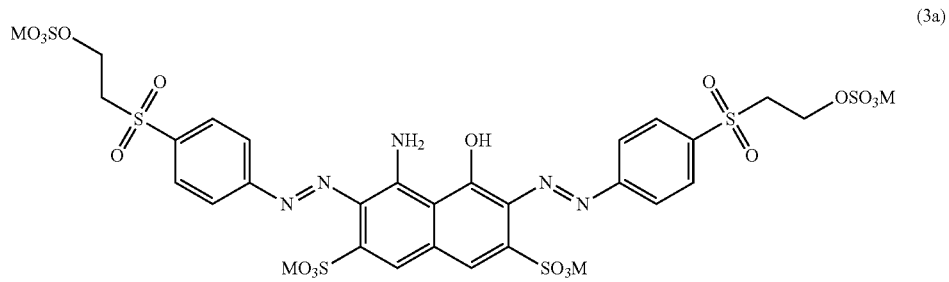

(3a)

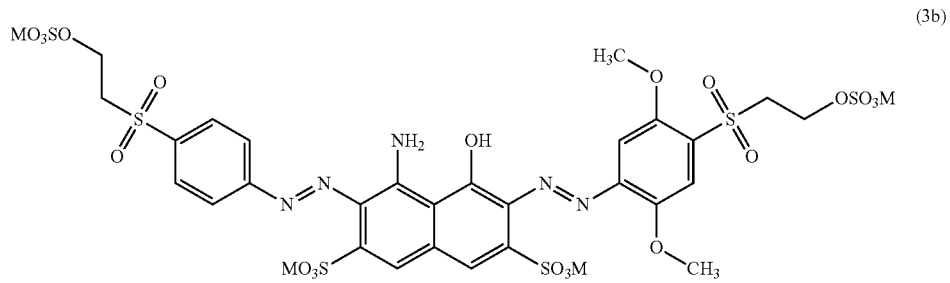

(3b)

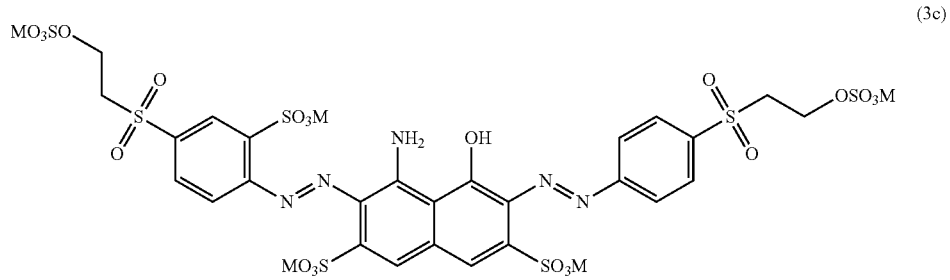

(3c)

-continued (3d)

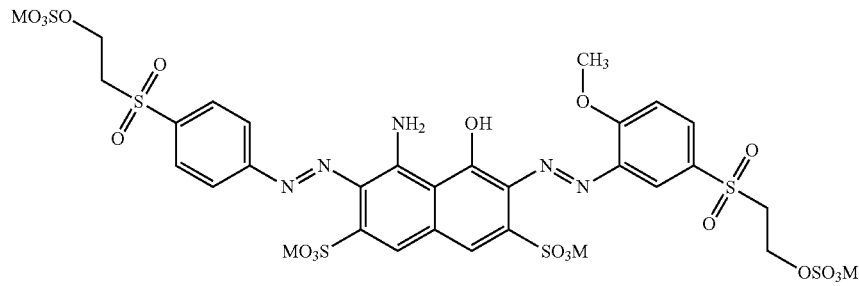

in which M is in each case defined as stated above and is preferably hydrogen or sodium.

Further preferred fiber-reactive dyes which can be used in a mixture with the dyes of the formula (1) are the dyes of the formula (4)

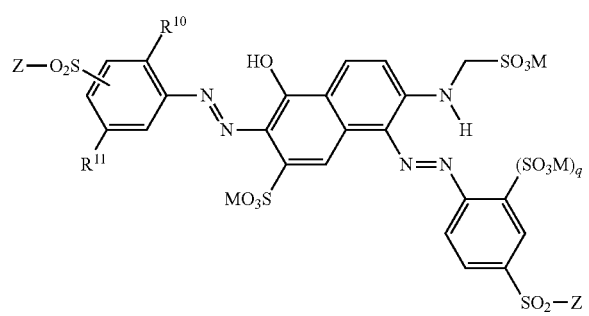

(4)

in which
$R^{10}$ and $R^{11}$ independently of one another are hydrogen, methyl, ethyl, methoxy or ethoxy; and
q is 0 or 1; and
Z and M are defined as stated above.

Particularly preferred dyes of the formula (4) are the dyes of the formulae (4a) to (4c)

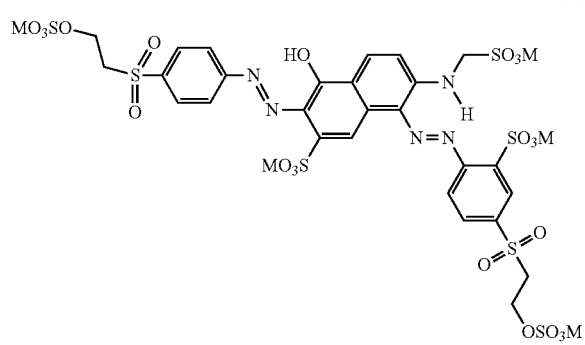

(4a)

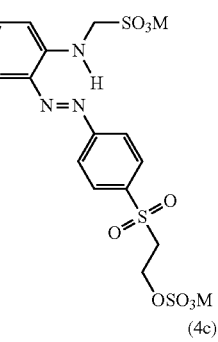

(4b)

(4c)

in which M in each case is defined as stated above and is preferably hydrogen or sodium.

Particularly preferred dye mixtures of the invention comprise a dye of the formula (1) together with a dye of the formula (3) and/or a dye of the formula (4) and are deep black-dyeing.

Deep black-dyeing mixtures comprising dyes of the formulae (1), (3), and (4) comprise more particularly dye of the formula (1) in amounts of 5% to 40% by weight, dye of the formula (3) in amounts of 50% to 90% by weight, and dye of the formula (4) in amounts of 5% to 40% by weight. 20:60:20, 15:70:15 and 20:65:15% by weight are typical mixing ratios.

The dyes of the formula (1) according to the present invention and the dye mixtures according to the present invention can be present as a preparation in solid or liquid (dissolved) form. In solid form, they contain, in general, the electrolyte salts customary in the case of water-soluble and, in particular, fiber-reactive, dyes, such as sodium chloride, potassium chloride and sodium sulfate, and may further contain the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogenphosphate, small amounts of siccatives or, if present in liquid, aqueous solution (including a content of thickeners of the type customary in print pastes), they may also contain substances which ensure a long life for these preparations, for example mold preventatives.

In general, the dyes of the formula (1) according to the present invention and the dye mixtures according to the present invention are present as a dye powder containing 20% to 85% by weight, based on the dye powder/preparation, on an electrolyte salt that is also known as a standardizer. These dye powders may further contain the aforementioned buffer substances in a total amount of up to 10% by weight, based on the dye powder. When the dyes of the formula (1) according to the present invention and the dye mixtures according to the present invention are present in aqueous solution, the total dye content in these aqueous solutions will be up to about 50% by weight, as for example between 5% and 50% by weight, and the electrolyte salt content in these aqueous solutions is preferably below 10% by weight, based on the aqueous solution; the aqueous solutions (liquid preparations) can contain the aforementioned buffer substances in an amount which is generally up to 10% by weight and preferably up to 2% by weight.

The dyes of the formula (1) according to the present invention are obtainable in a conventional manner, for instance through synthesis by means of customary diazotization and coupling reactions using appropriate components in a manner familiar to one skilled in the art and using the requisite proportions.

Thus, the dyes of the formula (1) according to the present invention are obtainable by diazotizing a compound of the formula (5)

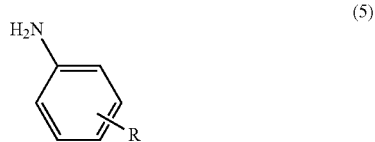

(5)

in which R is defined as stated above, with subsequent coupling onto a compound of the formula (6)

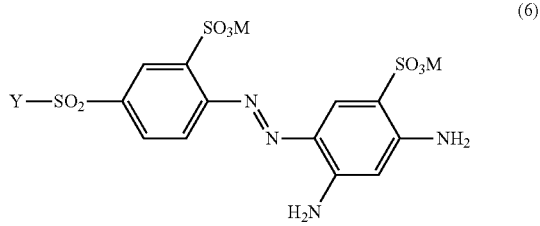

(6)

in which Y and M are defined as stated above.

Separation of the chemically produced dyes of the formula (1) according to the present invention, from their as-synthesized solution, can be effected by the following generally known methods, for example either by precipitation from the reaction medium by means of electrolytes, such as sodium chloride or potassium chloride for example, or by evaporating or spray-drying the reaction solution, in which case a buffer substance can be added to this reaction solution.

The compounds of the formulae (5) and (6) are known and preparable by methods known to one skilled in the art.

The dye mixtures according to the present invention can be prepared by customary procedures which are known to one skilled in the art: for example, by mechanical mixing of the individual dyes, which may be in the form of dye powders or granules or in the form of aqueous solutions, for example as-synthesized solutions which may still comprise customary auxiliaries.

The dyes of the formula (1) according to the present invention and the dye mixtures according to the present invention have useful application properties and can be used for dyeing and printing materials comprising carboxamido and/or hydroxyl groups. The materials mentioned can be for example in the form of sheetlike structures such as paper and leather, in the form of films, such as polyamide films for example, or in the form of a bulk composition, as of polyamide or polyurethane for example. Particularly, however, they are present in the form of fibers of the materials mentioned.

Thus dyes of the formula (1) according to the present invention and the dye mixtures according to the present invention are used for dyeing and printing cellulosic fiber materials of any kind. They are preferably also useful for dyeing or printing polyamide fibers or blend fabrics composed of polyamide with cotton or with polyester fibers.

It is also possible to use the dyes of the formula (1) according to the present invention and the dye mixtures according to the present invention to print textiles, paper or other materials by the inkjet process.

The present invention accordingly also provides for the use of the dyes of the formula (1) according to the present invention and the dye mixtures according to the present invention for dyeing or printing materials comprising carboxamido and/or hydroxyl groups, or rather methods of dyeing or printing such materials in a conventional manner, by using one or more dyes of the formula (1) according to the present invention and the dye mixtures according to the present invention as a colorant. The dyes of the formula (1) according to the present invention and the dye mixtures according to the present invention provide dyeings having very good fastness properties on these materials, preferably fiber materials.

Advantageously, the as-synthesized solutions of the dyes of the formula (1) according to the present invention and the dye mixtures according to the present invention can be used directly as a liquid preparation for dyeing, if appropriate after addition of a buffer substance and if appropriate after concentration or dilution.

Fiber materials or fibers in the context of the present invention are in particular textile fibers which can be present as woven fabrics, yarns or in the form of hanks or wound packages.

Examples of materials comprising carboxamido groups are synthetic and natural polyamides and polyurethanes, in particular in the form of fibers, for example wool and other animal hairs, silk, leather, nylon-6,6, nylon-6, nylon-11 and nylon-4.

Materials comprising hydroxyl groups are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers. Regenerated cellulose fibers are for example staple viscose and filament viscose.

The dyes of the formula (1) according to the present invention and the dye mixtures according to the present invention can be applied to and fixed on the materials mentioned, in particular on the fiber materials mentioned, by following the application techniques known for water-soluble and particularly for fiber-reactive dyes.

On cellulose fibers, dyeings having very good color yields are obtained by exhaust methods from a short liquor as well as from a long liquor, by using various acid-binding agents and if appropriate neutral salts, such as sodium chloride or sodium sulfate.

The liquor ratio can be selected within a wide range and is for example between 5:1 and 100:1, preferably between 5:1 and 30:1. Dyeing is preferably done in an aqueous bath at temperatures between 40 and 105° C., if appropriate at a temperature of up to 130° C. under superatmospheric pressure, and if appropriate in the presence of customary dyeing auxiliaries.

One possible procedure is to introduce the material into the warm bath and to gradually heat the bath to the desired temperature and complete the dyeing operation. The neutral salts which speed up the exhaustion of the dyes can also if desired only be added to the bath after the actual dyeing temperature has been reached.

Padding processes likewise provide excellent color yields and a very good color buildup on cellulose fibers, the dyes being fixable in a conventional manner by batching at room temperature or elevated temperature, for example at up to about 60° C., by steaming or by means of dry heat.

Similarly, the customary printing processes for cellulose fibers, which can be carried out in one step, for example by printing with a print paste comprising sodium bicarbonate or some other acid-binding agent, and by subsequent steaming at 100 to 103° C., or in two steps, for example by printing with a neutral or weakly acidic print paste and then fixing either by passing the printed materials through a hot electrolyte-containing alkaline bath, or by overpadding with an alkaline electrolyte-containing padding liquor and subsequent batching or steaming or dry heat treatment of the alkali-overpadded material, produce strong color prints with well-defined contours and a clear white ground. The outcome of the prints is affected little by variations in the fixing conditions.

When fixing by means of dry heat by following the customary thermofix processes, hot air at 120 to 200° C. is used. In addition to the customary steam at 101 to 103° C., it is also possible to use superheated steam and high-pressure steam at temperatures of up to 160° C.

The acid-binding agents which effect the fixation of the dyes on the cellulose fibers are for example water-soluble basic salts of alkali metals and likewise alkaline earth metals of inorganic or organic acids or compounds which liberate alkali in the heat. Particularly suitable are the alkali metal hydroxides and alkali metal salts of weak to medium inorganic or organic acids, the preferred alkali metal compounds being the sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

The dyes of the formula (1) according to the present invention and the dye mixtures according to the present invention are notable for outstanding color strength and a steep course of the buildup curve on cellulose fiber materials when applied in the familiar dyeing and printing processes.

The dyeings and prints obtainable with the dyes of the formula (1) according to the present invention and the dye mixtures according to the present invention on cellulose fiber materials further have good lightfastness and, in particular, good wetfastnesses, such as fastness to washing, milling, water, seawater, crossdyeing and acidic and alkaline perspiration, also good fastness to pleating, hotpressing and rubbing.

The dyeings and prints obtained following the customary aftertreatment of rinsing to remove unfixed dye portions further exhibit excellent wetfastnesses, in particular since unfixed dye portions are easily washed off because of their good solubility in cold water.

Furthermore, the dyes of the formula (1) according to the present invention and the dye mixtures according to the present invention can also be used for the fiber-reactive dyeing of wool. Wool which has been given a nonfelting or low-felting finish (cf. for example H. Rath, Lehrbuch der Textilchemie, Springer-Verlag, 3rd edition (1972), pages 295-299, especially finished by the Hercosett process (page 298); J. Soc. Dyers and Colourists 1972, 93-99, and 1975, 33-44) can be dyed to very good fastness properties. The process of dyeing on wool is here carried out in a conventional manner from an acidic medium. For instance, acetic acid and/or ammonium sulfate or acetic acid and ammonium acetate or sodium acetate can be added to the dyebath to obtain the desired pH. To obtain a dyeing of acceptable levelness, it is advisable to add a customary leveling agent, for example a leveling agent based on a reaction product of cyanuric chloride with three times the molar amount of an aminobenzenesulfonic acid and/or of an aminonaphthalenesulfonic acid or on the basis of a reaction product of for example stearylamine with ethylene oxide. For instance, the dye according to the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the mixture according to the invention and the fiber. At the same time, the dye portion not reactively bound is removed.

The procedure described herein also applies to the production of dyeings on fiber materials composed of other natural polyamides or of synthetic polyamides and polyurethanes. These materials can be dyed using the customary dyeing and printing processes described in the literature and known to one skilled in the art (see for example H.-K. Rouette, Handbuch der Textilveredlung, Deutscher Fachverlag GmbH, Frankfurt/Main). In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dyes of the formula (1) according to the invention and the dye mixtures according to the present invention is very good, they can also be used with advantage in customary continuous dyeing processes. The color strength of the dyes of the formula (1) according to the invention and the dye mixtures according to the present invention is very high.

The present invention also provides inks for digital textile printing by the inkjet process, comprising one or more dyes of the formula (1) according to the present invention, or a dye mixture of the invention.

The inks of the present invention contain dye of the formula (1) according to the present invention and the dye mixture according to the present invention in amounts of for example 0.1% to 50% by weight, preferably in amounts of 1% to 30% by weight and more preferably in amounts of 1% to 15% by weight, based on the total weight of the ink.

For the inks to be used in the continuous flow process, a conductivity of 0.5 to 25 mS/m can be set by adding an electrolyte.

Useful electrolytes include for example lithium nitrate and potassium nitrate.

The inks of the present invention can contain organic solvents in a total amount of 1-50% and preferably 5-30% by weight.

Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 2,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 2 to 8 alkylene groups, for example monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as, for example: methylamine, ethylamine, triethylamine, diethylamine, dimethylamine, trimethylamine, dibutylamine, diethanolamine, triethanolamine, N-formylethanolamine, ethylenediamine, urea derivatives, such as for example: urea, thiourea, N-methylurea, N,N'-epsilon-dimethylurea, ethyleneurea, 1,1,3,3-tetramethylurea, N-acetylethanolamine, amides, such as for example: dimethylformamide, dimethylacetamide, acetamide, ketones or keto alcohols, such as for example: acetone, diacetone alcohol, cyclic ethers, such as for example; tetrahydrofuran, trimethylolethane, trimethylolpropane, 2-butoxyethanol, benzyl alcohol, 2-butoxyethanol, gamma butyrolactone, epsilon-caprolactam, further sulfolane, dimethylsulfolane, methylsulfolane, 2,4-dimethylsulfolane, dimethyl sulfone, butadiene sulfone, dimethyl sulfoxide, dibutyl sulfoxide, N-cyclohexyl-pyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy) ethanol, 2-(2-ethoxyethoxy)ethanol, 2-(2-butoxyethoxy) ethanol, 2-(2-propoxyethoxy)ethanol, pyridine, piperidine, butyrolactone, trimethylpropane, 1,2-dimethoxypropane, dioxane, ethyl acetate, ethylenediaminetetraacetate, ethyl pentyl ether, 1,2-dimethoxypropane and trimethylpropane.

The inks of the present invention may further contain customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas.

Useful viscosity moderators include rheological additives, for example: polyvinylcaprolactam, polyvinylpyrrolidone and their copolymers, polyether polyol, associative thickeners, polyurea, polyurethane, sodium alginates, modified galactomannans, polyetherurea, polyurethane, nonionic cellulose ethers.

As further additives the inks of the invention may include surface-active substances to set surface tensions of 20 to 65 mN/m, which are adapted if necessary as a function of the process used (thermal or piezo technology).

Useful surface-active substances include for example: all surfactants, preferably nonionic surfactants, butyldiglycol and 1,2-hexanediol.

The inks may further include customary additives, for example substances to inhibit fungal and bacterial growth in amounts from 0.01 to 1% by weight based on the total weight of the ink.

The inks of the invention may be prepared in a conventional manner by mixing the components in water.

The inks of the invention are useful in inkjet printing processes for printing a wide variety of pretreated materials, such as silk, leather, wool, cellulosic fiber materials of any kind and polyurethanes, and especially polyamide fibers. The printing inks of the invention are also useful for printing pretreated hydroxyl- or amino-containing fibers present in blend fabrics, for example blends of cotton, silk, wool with polyester fibers or polyamide fibers.

In contrast to conventional textile printing, where the print paste already contains all the fixing chemicals and thickeners for a reactive dye, in inkjet printing the auxiliaries have to be applied to the textile substrate in a separate pretreatment step.

The pretreatment of the textile substrate, for example cellulose and regenerated cellulose fibers and also silk and wool, is effected with an aqueous alkaline liquor prior to printing. To fix reactive dyes there is a need for alkali, for example sodium carbonate, sodium bicarbonate, sodium acetate, trisodium phosphate, sodium silicate, sodium hydroxide, alkali donors such as, for example, sodium chloroacetate, sodium formate, hydrotropic substances such as, for example, urea, reduction inhibitors, for example sodium nitrobenzenesulfonates, and also thickeners to prevent flowing of the motives when the printing ink is applied, for example sodium alginates, modified polyacrylates or highly etherified galactomannans.

These pretreatment reagents are uniformly applied to the textile substrate in a defined amount using suitable applicators, for example using a 2- or 3-roll pad, contactless spraying technologies, by means of foam application or using appropriately adapted inkjet technologies, and subsequently dried.

After printing, the textile fiber material is dried at 120 to 150° C. and subsequently fixed.

The fixing of the inkjet prints prepared with reactive dyes may be effected at room temperature or with saturated steam, with superheated steam, with hot air, with microwaves, with infrared radiation, with laser or electron beams or with other suitable energy transfer techniques.

A distinction is made between one- and two-phase fixing processes:

In one-phase fixing, the necessary fixing chemicals are already on the textile substrate.

In two-phase fixing, this pretreatment is unnecessary. Fixing only requires alkali, which, following inkjet printing, is applied prior to the fixing process, without intermediate drying. There is no need for further additives such as urea or thickener. Fixing is followed by the print aftertreatment, which is the prerequisite for good fastnesses, high brilliance and an impeccable white ground.

The prints produced using the inks of the present invention have a high color strength and a high fiber-dye bond stability not only in the acidic region but also in the alkali region, also good lighffastness and very good wetfastness properties, such as fastness to washing, water, seawater, crossdyeing and perspiration, and also good fastness to pleating, hotpressing and rubbing.

The examples hereinbelow serve to illustrate the invention. Parts and percentages are by weight, unless otherwise stated. Parts by weight relate to parts by volume as the kilogram relates to the liter. The compounds described in the examples in terms of a formula are indicated in the form of the sodium salts, since they are generally prepared and isolated in the form of their salts, preferably sodium or potassium salts, and used for dyeing in the form of their salts. The starting compounds described in the examples hereinbelow can be used in the synthesis in the form of the free acid or likewise in the form of their salts, preferably alkali metal salts, such as sodium or potassium salts.

Example 1 a) 13.7 parts of 3-aminobenzoic acid are introduced into 100 parts of water. 20 parts of concentrated hydrochloric acid and 100 parts of ice are added and over the course of 30 minutes a solution of 7 parts of sodium nitrite in 20 parts of water is added dropwise. This is followed by stirring at 0-5° C. for 1 hour. Excess nitrite is decomposed with amidosulfonic acid.

b) 56 parts of 2,4-diamino-5-[2-sulfo-4-(2-sulfooxyethane-sulfonyl)phenyl-azo]benzenesulfonic acid are dissolved in 300 parts of water at pH of 6-7 and the diazo compound prepared in a) is added dropwise, a pH of between 6 and 7 being maintained with 20% strength sodium carbonate solution. The temperature is 20-25° C., and stirring is continued until the reaction is at an end. Finally the reaction mixture obtained is dried under reduced pressure.

The dye obtained ($\lambda_{max}$=430 nm) conforms to the formula (1a)

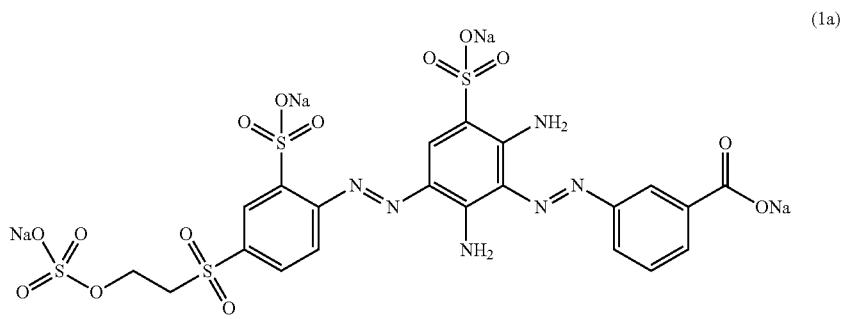

and dyes cotton in an orange shade.

Example 2

Replacing the 3-aminobenzoic acid from example 1 by 13.6 parts of 3-amino-benzamide and proceeding in the same way as in example 1 gives the dye of the formula (1b)

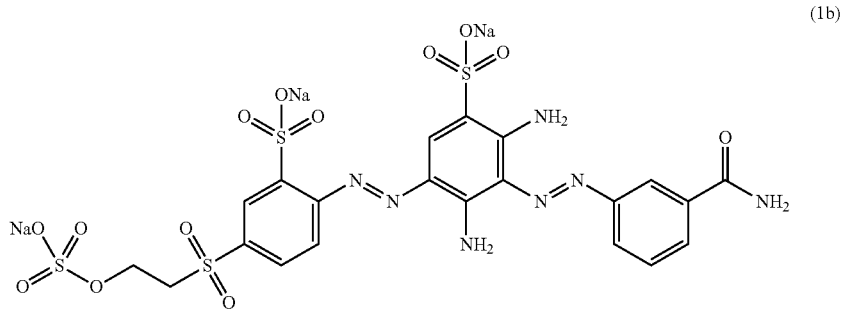

($\lambda_{max}$=427 nm).

Example 3

Replacing the 3-aminobenzoic acid from example 1 by 3-aminobenzonitrile and proceeding in the same way as in example 1 gives the dye of the formula (1c)

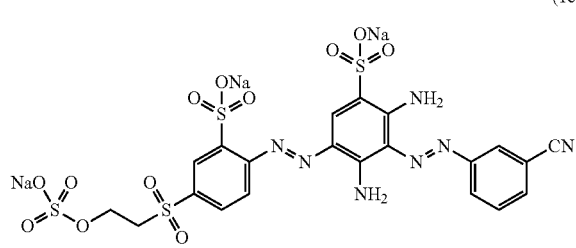

($\lambda_{max}$=421 nm).

Examples 4 to 15 of the general formula (1d), with the definitions for D as stated in the table, can be prepared in the same way as in example 1.

| Example | D | $\lambda_{max}$(nm) |
|---|---|---|
| 4 | 3-methyl methyl benzoate | 426 |
| 5 | 3-methyl ethyl benzoate | 426 |
| 6 | 2-methyl benzoic acid | 423 |
| 7 | 2-methyl benzamide | 422 |
| 8 | 2-methyl benzonitrile | 423 |
| 9 | 2-methyl methyl benzoate | 419 |
| 10 | 2-methyl ethyl benzoate | 419 |
| 11 | 4-methyl benzoic acid | 419 |
| 12 | 4-methyl benzamide | 418 |
| 13 | 4-methyl benzonitrile | 417 |
| 14 | 4-methyl methyl benzoate | 416 |
| 15 | 4-methyl ethyl benzoate | 416 |

Example 16

2 parts of the dye obtained as per example 1 and 50 parts of sodium chloride are dissolved in 999 parts of water and 5 parts of sodium carbonate, 0.7 part of sodium hydroxide (in the form of a 32.5% aqueous solution) and, if appropriate, 1 part of a wetting agent are added. This dyebath is entered with 100 g of a woven cotton fabric. The temperature of the dyebath is initially maintained at 25° C. for 10 minutes, then raised to the final temperature (40-80° C.) over 30 minutes and maintained at the final temperature for a further 60-90 minutes. Thereafter, the dyed fabric is initially rinsed with tap water for 2 minutes and then with deionized water for 5 minutes. The dyed fabric is neutralized at 40° C. in 1000 parts of an aqueous solution which contains 1 part of 50% acetic acid for 10 minutes. It is rinsed again with deionized water at 70° C. and then soaped off at the boil with a laundry detergent for 15 minutes, rinsed once more and dried to provide an orange dyeing having very good fastness properties.

Similar results are obtained when the process described is repeated with the dyes obtained as per examples 2 to 15.

Example 17

4 parts of the dye obtained as per example 1 and 50 parts of sodium chloride are dissolved in 998 parts of water and 5 parts of sodium carbonate, 2 parts of sodium hydroxide (in the form of a 32.5% aqueous solution) and if appropriate 1 part of wetting agent are added. This dyebath is entered with 100 g of a woven cotton fabric. The rest of the processing is carried out as reported in example 16 to provide an orange dyeing of high color intensity and having very good fastness properties. Similar results are obtained when the process described is repeated with the dyes obtained as per examples 2 to 15.

Example 18

A textile fabric consisting of mercerized cotton is padded with a liquor containing 35 g/l of anhydrous sodium carbonate, 100 g/l of urea and 150 g/l of a low viscosity sodium alginate solution (6%) and then dried. The wet pickup is 70%.

The thus pretreated textile is printed with an aqueous ink containing
2% of the dye as per example 1
20% of sulfolane
0.01% of Mergal K9N
77.99% of water
using a drop-on-demand (bubble jet) inkjet print head. The print is fully dried. It is fixed by means of saturated steam at 102° C. for 8 minutes. The print is then rinsed warm, subjected to a fastness wash with hot water at 95° C., rinsed warm and then dried. The result is an orange print having excellent service fastnesses.

Example 19

A textile fabric consisting of mercerized cotton is padded with a liquor containing 35 g/l of anhydrous sodium carbonate, 50 g/l of urea and 150 g/l of a low viscosity sodium alginate solution (6%) and then dried. The wet pickup is 70%. The thus pretreated textile is printed with an aqueous ink containing
8% of the dye as per example 1
20% of 1,2-propanediol
0.01% of Mergal K9N and
71.99% of water
using a drop-on-demand (bubble jet) inkjet print head. The print is fully dried. It is fixed by means of saturated steam at 102° C. for 8 minutes.

The print is then rinsed warm, subjected to a fastness wash with hot water at 95° C., rinsed warm and then dried. The result is an orange print having excellent service fastnesses.

Example 20

A textile fabric consisting of mercerized cotton is padded with a liquor containing 35 g/l of anhydrous sodium carbonate, 100 g/l of urea and 150 g/l of a low viscosity sodium alginate solution (6%) and then dried. The wet pickup is 70%. The thus pretreated textile is printed with an aqueous ink containing
8% of the dye as per example 1
15% of N-methylpyrrolidone
0.01% of Mergal K9N and
77.99% of water
using a drop-on-demand (bubble jet) inkjet print head. The print is fully dried. It is fixed by means of saturated steam at 102° C. for 8 minutes. The print is then rinsed warm, subjected to a fastness wash with hot water at 95° C., rinsed warm and then dried. The result is an orange print having excellent service fastnesses.

Comparative Example 1

The lightfastness of dyeings obtained on cotton tricot in standard depth of shade with dyes of the formulae (1a), (1b) and (1c) and also with the dyes of the formula (a)

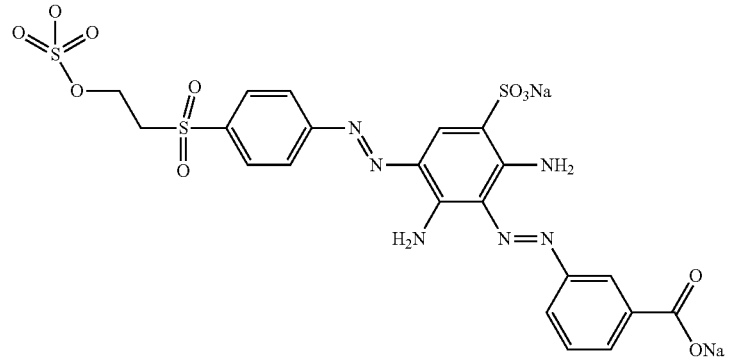

and (b)

(b)

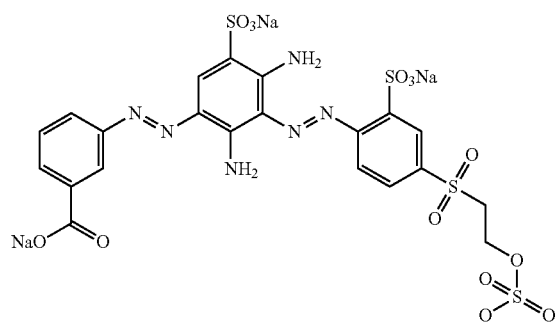

as described in KR 20020038989 was determined (DIN 54004). Assessment was according to the lightfastness scale where 1 is the worst and 6 the best lightfastness. The following values were obtained:

| Dye | Lightfastness |
|---|---|
| (1a) | 4 |
| (1b) | 4 |
| (1c) | 4 |
| (a) | 3 |
| (b) | 2-3 |

It therefore emerges, surprisingly, that the lightfastness of the inventive dyes of the formulae (1a), (1b) and (1c) is appreciably better than in the case of prior art dyes (a) and (b).

Comparative Example 2

DIN EN ISO105-C06-C2 "washfastness 60° C." of dyeings obtained with the dye of the formula (1a) and also with the dye of the formula (a) as per KR 20020038989 was determined.

In this fastness test, the staining of adjacent cotton fabric is assessed. On the assessment scale used, 5 denotes no staining whatsoever and 1 denotes substantial staining. The following results were obtained:

| Dye | After wash |
|---|---|
| (1a) | 4-5 |
| (a) | 3-4 |

It thus emerges that the post-dyeing washoff of unfixed dye is appreciably better in the case of dye (1a) than in the case of dye (a).

Examples 21 to 30 below relate to inventive dye mixtures which are prepared by mechanical mixing of the stated dyes in the stated mixing ratios. The dye mixtures yield yellow or golden yellow dyeings.

| Example | Dye of the formula (1) as per: | Dye of the | (1):(2) mixing ratio | Hue |
|---|---|---|---|---|
| 21 | Example 1 | Formula (2b) | 10:90 | yellow |
| 22 | Example 1 | Formula (2b) | 30:70 | golden yellow |
| 23 | Example 2 | Formula (2a) | 20:80 | yellow |
| 24 | Example 5 | Formula (2d) | 40:60 | golden yellow |
| 25 | Example 10 | Formula (2g) | 30:70 | golden yellow |
| 26 | Example 11 | Formula (2f) | 50:50 | orange |
| 27 | Example 7 | Formula (2e) | 10:90 | golden yellow |
| 28 | Example 13 | Formula (2h) | 50:50 | orange |
| 29 | Example 15 | Formula (2c) | 20:80 | orange |
| 30 | Example 11 | Formula (2b) | 20:80 | yellow |

Examples 31 to 47 below relate to further inventive dye mixtures which are prepared by mechanical mixing of stated dyes in the stated mixing ratios.

| Example | Dye of the formula (1) as per: | Dye of the | Dye of the | (1):(3):(4) mixing ratio | Hue |
|---|---|---|---|---|---|
| 31 | Example 1 | Formula (3a) | Formula (4a) | 20:65:15 | black |
| 32 | Example 2 | Formula (3a) | Formula (4b) | 15:70:15 | black |
| 33 | Example 3 | Formula (3a) | Formula (4a) | 20:65:15 | black |
| 34 | Example 5 | Formula (3d) | Formula (4b) | 20:65:15 | black |
| 35 | Example 12 | Formula (3b) | Formula (4c) | 5:60:35 | black |
| 36 | Example 10 | Formula (3c) | Formula (4a) | 20:60:20 | black |
| 37 | Example 13 | Formula (3b) | Formula (4c) | 10:60:30 | black |
| 38 | Example 1 | — | Formula (4a) | 70:30 | orange |
| 39 | Example 2 | — | Formula (4a) | 30:70 | scarlet |
| 40 | Example 8 | — | Formula (4b) | 80:20 | orange |
| 41 | Example 8 | — | Formula (4c) | 10:90 | red |
| 42 | Example 11 | — | Formula (4c) | 50:50 | scarlet |
| 43 | Example 1 | Formula (3a) | — | 50:50 | green |
| 44 | Example 12 | Formula (3c) | — | 20:80 | greenish navy |
| 45 | Example 9 | Formula (3d) | — | 10:90 | greenish navy |
| 46 | Example 7 | Formula (3b) | — | 15:85 | greenish navy |
| 47 | Example 11 | Formula (3a) | Formula (4c) | 20:65:15 | black |

What is claimed is:

1. An azo dye of the formula (1)

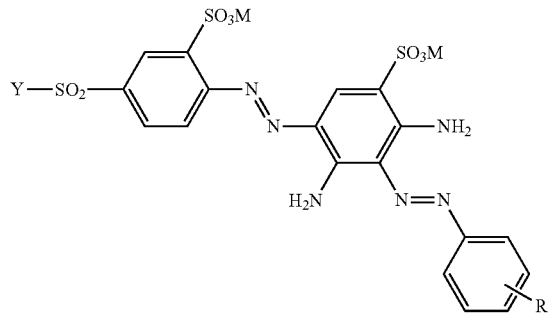

in which
Y is —CH=CH$_2$ or —CH$_2$CH$_2$Z, in which
Z is an alkali-detachable group;
R is a radical —COOR$^1$, —CN or —CONR$^2$R$^3$, in which
R$^1$ is M or (C$_1$-C$_4$)-alkyl;
R$^2$ and R$^3$ independently of one another are hydrogen or (C$_1$-C$_4$)-alkyl; and
M is hydrogen, ammonium, an alkali metal, or the equivalent of an alkaline earth metal.

2. The azo dye as claimed in claim 1, wherein Y is vinyl, β-chloroethyl or β-sulfatoethyl.

3. The azo dye as claimed in claim 1, wherein R is —COOM or —CONH$_2$, where M is hydrogen or sodium.

4. The azo dye as claimed in claim 2, wherein R is —COOM or —CONH$_2$, where M is hydrogen or sodium.

5. A dye mixture which comprises the dye of the formula (1) as claimed in claim 1 and at least one further fiber-reactive dye.

6. The dye mixture as claimed in claim 5, which comprises as further fiber-reactive dye a dye of the formula (2)

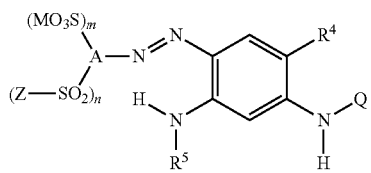

in which
A is

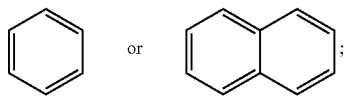 [SMILES: c1ccccc1 ; c1ccc2ccccc2c1]

R$^4$ is hydrogen, methyl, methoxy or sulfo;
R$^5$ is hydrogen, acetyl or carbonylamido;
n is 0 or 1;
m is 0, 1, 2 or 3;
Z is an alkali-detachable group;
M is hydrogen, ammonium, an alkali metal, or the equivalent of an alkaline earth metal; and Q is a radical of the formula (a), (b) or (c)

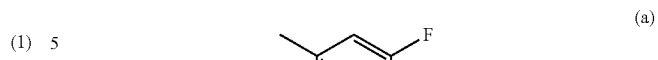

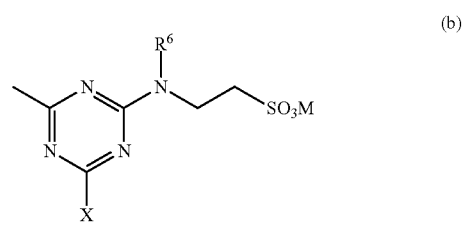

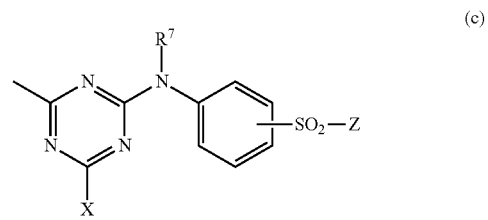

in which
X is halogen;
R$^6$ and R$^7$ are hydrogen, methyl or ethyl; and
M and Z are defined above.

7. The dye mixture as claimed in claim 6, X is fluoro or chloro.

8. The dye mixture as claimed in claim 5, which comprises as further fiber-reactive dye a dye of the formula (3)

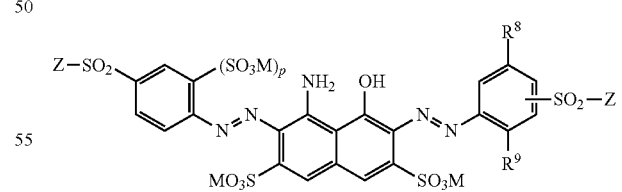

in which
R$^8$ and R$^9$ independently of one another are hydrogen, methyl, ethyl, methoxy or ethoxy;
p is 0 or 1;
Z is an alkali-detachable group;
M is hydrogen, ammonium, an alkali metal, or the equivalent of an alkaline earth metal; and/or a dye of the formula (4)

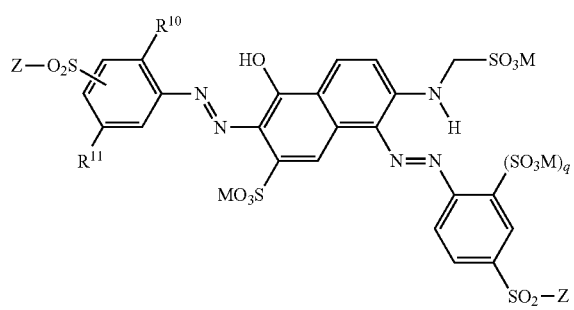
(4)

in which
R¹⁰ and R¹¹ independently of one another are hydrogen, methyl, ethyl, methoxy or ethoxy;
q is 0 or 1; and
Z and M are defined as above.

9. A process for preparing the azo dye as claimed in claim 1, which comprises diazotizing a compound of the formula (5)

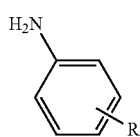
(5)

in which R is defined as stated in claim 1 and then carrying out coupling onto a compound of the formula (6)

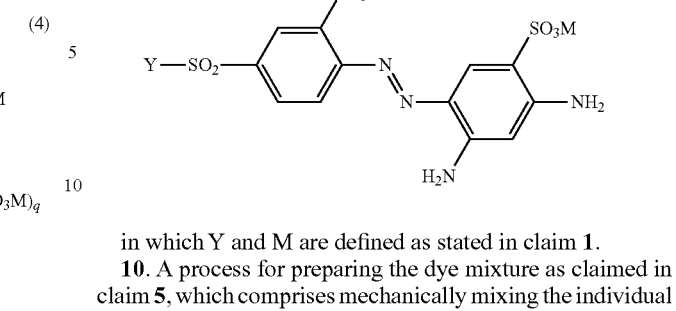
(6)

in which Y and M are defined as stated in claim 1.

10. A process for preparing the dye mixture as claimed in claim 5, which comprises mechanically mixing the individual dyes.

11. A method of dyeing or printing hydroxy- and/or carboxamido-containing material, which comprises applying one or more dyes as claimed in claim 1 in dissolved form to the material and fixing the dye or dyes on the material by means
of heat,
with the aid of an alkaline agent, or
by means of heat and with the aid of an alkaline agent.

12. A method of dyeing or printing hydroxy- and/or carboxamido-containing material, which comprises applying one or more dyes as claimed in claim 4 in dissolved form to the material and fixing the dye mixture on the material by means
of heat,
with the aid of an alkaline agent, or
by means of heat and with the aid of an alkaline agent.

13. An ink for digital textile printing by the inkjet process, which comprises the azo dye as claimed in claim 1.

14. An ink for digital textile printing by the inkjet process, which comprises the dye mixture as claimed in claim 5.

* * * * *